US008681693B2

(12) United States Patent
Kennedy et al.

(10) Patent No.: US 8,681,693 B2
(45) Date of Patent: Mar. 25, 2014

(54) DYNAMIC NETWORKING SPECTRUM REUSE TRANSCEIVER

(76) Inventors: Robert A. Kennedy, Austin, TX (US); William R. Highsmith, Indialantic, FL (US); Robert J. Lawless, Apopka, FL (US); William F. Bernett, Melbourne, FL (US); Paul G. Greenis, Indian Harbour Beach, FL (US)

(*) Notice: Subject to any disclaimer, the term of this patent is extended or adjusted under 35 U.S.C. 154(b) by 599 days.

(21) Appl. No.: 12/501,921

(22) Filed: Jul. 13, 2009

(65) Prior Publication Data

US 2010/0061299 A1     Mar. 11, 2010

Related U.S. Application Data

(60) Provisional application No. 61/080,202, filed on Jul. 11, 2008, provisional application No. 61/121,797, filed on Dec. 11, 2008, provisional application No. 61/083,420, filed on Jul. 24, 2008.

(51) Int. Cl.
    *H04W 40/00*          (2009.01)

(52) U.S. Cl.
    USPC ............ 370/328; 370/343; 370/337; 370/329

(58) Field of Classification Search
    USPC ......... 370/328, 338, 343, 252, 329; 455/509, 455/522

See application file for complete search history.

(56) References Cited

U.S. PATENT DOCUMENTS

| 5,668,828 | A * | 9/1997 | Sanderford et al. | 375/136 |
|---|---|---|---|---|
| 6,744,984 | B1 * | 6/2004 | Faruque et al. | 398/57 |
| 6,965,568 | B1 * | 11/2005 | Larsen | 370/238 |
| 2003/0125067 | A1 * | 7/2003 | Takeda et al. | 455/522 |
| 2007/0019603 | A1 * | 1/2007 | Gerhardt et al. | 370/343 |
| 2007/0104140 | A1 * | 5/2007 | Ashish et al. | 370/329 |
| 2007/0121521 | A1 * | 5/2007 | D'Amico et al. | 370/252 |
| 2007/0160014 | A1 * | 7/2007 | Larsson | 370/338 |
| 2007/0165581 | A1 * | 7/2007 | Mehta et al. | 370/338 |
| 2007/0266134 | A1 * | 11/2007 | Shyy et al. | 709/223 |
| 2008/0014880 | A1 * | 1/2008 | Hyon et al. | 455/161.1 |
| 2008/0166974 | A1 * | 7/2008 | Teo et al. | 455/67.11 |
| 2008/0261639 | A1 * | 10/2008 | Sun et al. | 455/515 |
| 2008/0317062 | A1 * | 12/2008 | Timmers et al. | 370/462 |
| 2009/0186646 | A1 * | 7/2009 | Ahn et al. | 455/509 |
| 2009/0197626 | A1 * | 8/2009 | Huttunen et al. | 455/522 |
| 2009/0247201 | A1 * | 10/2009 | Ye et al. | 455/509 |
| 2010/0046483 | A1 * | 2/2010 | Nandagopalan | 370/337 |

* cited by examiner

*Primary Examiner* — Rasheed Gidado

(57) ABSTRACT

Systems and methods are disclosed for the operation of a network of cognitive radios in a dynamic network topology. The systems and methods make use cross-layer communications to input parameters required by network services into a reasoning engine, which in turns processes the parameter the parameter information and reports linguistic results to the network services. The cross-layer communications are leveraged to shift network service functionality to the MAC or PHY Layers. Route discovery functionality is shifted from routing services down to the MAC or PHY Layers. The route discovery functionality is implemented by a process to elect a relay node based on the number of available channels that each of the source node neighbors has available to communicate with other neighbors.

1 Claim, 7 Drawing Sheets

DYNAMIC NETWORKING SPECTRUM REUSE TRANSCEIVER

CROSS REFERENCE TO RELATED APPLICATIONS

The present invention claims the benefit of U.S. Provisional Application Ser. No. 61/080,202, filed Jul. 11, 2008, by Robert A. Kennedy et al., entitled "Dynamic Networking Reuse Spectrum Transceiver", the disclosure of which is incorporated herein. The following are incorporated herein by reference: U.S. Pat. No. 7,457,295; U.S. Patent Publication No. 20090074033; U.S. patent application Ser. No. 11/532,306; U.S. Patent Provisional Application No. 61/121,797; and U.S. Patent Provisional Application No. 61/083,420.

FIELD OF THE INVENTION

The present invention relates to the field of communication networks, and more particularly, to mobile ad hoc wireless networks, general mesh networks, wireless sensor networks and related methods.

BACKGROUND OF THE INVENTION

Ad hoc networks are self-forming networks which can operate in the absence of any fixed infrastructure. An ad hoc network may typically include a number of geographically-distributed, potentially mobile units, sometimes referred to as "nodes", which are wirelessly connected to each other by one or more links such as, for example, radio frequency communication channels. The nodes can communicate with each other over a wireless channel without the support of an infrastructure-based or wired network.

Links or connections between the nodes in the network can change dynamically in an arbitrary manner as nodes move in and out of, or within the ad hoc network. Because the topology of an ad hoc network can change significantly, techniques are needed which can allow the ad hoc network to dynamically adjust to these changes. Due to the lack of a central server-controller, many network-controlling functions can be distributed among the nodes such that the nodes can self-organize and reconfigure in response to spectrum topology changes.

Most traditional radios have their technical characteristics set at the time of manufacture. More recently, radios have been built to self-adapt to one of several preprogrammed radio frequency (RF) environments that might be encountered. Cognitive radios ("CRs") go beyond preprogrammed settings to operate both in known and unknown wireless channels.

CRs have emerged on the forefront of communications technology for those seeking radios capable of conducting quality communications over decreasingly-available RF spectrum due to many more users requiring larger amounts of spectrum for wireless voice, video and data. A CR determines where in the spectrum it can transmit and receive and where it can spectrally move to in the event it can no longer utilize frequency channels that it has been using due to poor channel quality or to being preempted by a primary user or higher priority secondary user.

Two very different approaches have arisen to equip advanced, opportunistic radios with the necessary technological core: geo-location and spectrum sensing. An opportunistic radio in the spectrum sense is one that will try to utilize any available RF spectrum that it can find currently unoccupied and, if operating in a licensed or government regulated band, has a legal government license to use. Geo-location approaches utilize location information of primary users (e.g., television stations, public safety teams) as provided by GPS, for example, to dictate the actual geographical area where opportunistic radios wanting to conduct communications cannot interfere. The second approach is called spectrum sensing. CRs that employ spectrum sensing technologies listen for or sense currently unoccupied channels to carry the traffic of the CR.

Most modern real world applications require at least three CRs communicating with each other to form a wireless network. A cognitive radio so equipped with the ability to initiate and maintain networked communications with other CRs even as each CR is dynamically adjusting the channel(s) it operates on is referred to as a Cognitive Networking Radio (CNR). CNR in general has to do with the radio being fully aware of: 1) who it is, including all of its characteristics (functionality, physical properties and limitations, etc.); and 2) who the users are and their applications and/or missions. CNR involves the radio not only being fully aware of things, but also having a deep enough understanding of the meaning or context of this information in order to allow it to optimize its performance and functionality to satisfy the requirements of the network, applications and users.

It is well-known today that manufacturing a cognitive radio and manufacturing a cognitive networking radio are two very different things. A cognitive radio may be defined as a wireless network node that changes its transmission and reception configuration to avoid interference signals from other users or devices. The cognitive radio monitors its environment within its allotted frequency bands and changes the frequencies or bands over which it operates based on the accessibility to those frequencies. On the other hand, a CNR performs all the functions of a cognitive radio but it also interacts with the networking-specific components and services (routing, quality of service "QoS", network management, etc.) of both itself and other nodes.

A mobile ad hoc network (MANET) is characterized by the lack of fixed networking infrastructure such as routers, switches, base stations and mobile switching centers in the traditional cellular sense. User nodes (radios) are in general also routers and vice versa. A MANET node is most often battery limited. Also, a MANET's network topology is usually dynamically changing with nodes coming in and going out of the network and with links being established and broken. A node while technically still within the geographic boundaries of the network, may experience a break off in connections to it because of internal node or link failures.

A fully-connected mesh network is one in which there are at least two paths to each node. Partially-connected mesh networks will have some nodes with only one path to it. "Connected" in this case does not have to be limited to each node's nearest one-hop neighbors. It also allows for nodes to be "connected" via multiple hops to all other nodes in the network. Although often used interchangeably in the art, the present application does not define a MANET and a mesh network as one and the same thing. A MANET involves nodes that form a mesh (partial or full), but also may be in motion and have an ad hoc nature or a deterministic or random basis. Although it may be stretching the tolerance of most network engineers, point-to-point, point-to-multipoint and mesh networks (static or mobile) may be thought of as trivial cases of MANETs. As it is now, Bluetooth scatternets are often referred to as ad hoc networks, but again they are just very trivial cases of MANETs. A more detailed description of MANETs and cross-layer communications in MANETs can be found in different documents made available, for example, by the Ubiquitous Internet Research Group through their website (http://cnd.iit.cnr.it/). One such document is entitled "MOBILEMAN, Architecture, Protocols, and Services", Deliverable D5, by Marco Conti et al. See:
http://cnd.iit.cnr.it/mobileMAN/deliverables/
MobileMAN_Deliverable_D5.pdf There are challenges to implementing a MANET of CNRs. The following constitute problems that affect a CNR's ability to support cognitive networking. Some of the problems include:

1. Negotiating non-interfering frequency-hopping sequences between adjacent ad hoc associations/nodes ("A/Ns").

2. Exchanging of whitespace/grayspace information between A/Ns.

3. Reconfiguring A/Ns to take on different roles such as the "hub" (master) or "remote" (slave).

4. Determining what knowledge is needed and how to formulate or express information as knowledge configured into the CNR and flowing through it. This "knowledge" is alternatively known in the art and referred to herein as cognitive knowledge base. This problem has to do with the form of the types of knowledge, such as rules, that govern the base of intelligence associated with the CNR. Knowledge could be downloaded and stored in the CNR upon initialization of the network and during post-initialization operation. Rules could include known or estimated allowed spectrum regions, types of traffic to permit use of the CNR, battery capacity/recharge rate/utilization rate under various types of traffic loading or mobility conditions, etc. Also, real-time event data could be collected and converted to forms such as fuzzy variables to be used in decision making at the individual or association CNR levels. Outputs from the CNR could be in the form of knowledge, and not just data, to be used as knowledge inputs for higher level reasoning processes involving the control and management of the whole network. In addition to rules, this knowledge may include but is not limited to knowledge of incumbent transmitters, such as for example, their location, transmission power, antenna characteristics, etc.

5. How to reason on the knowledge determined. Once the expression of the selected knowledge has been decided and knowledge is being or has been collected, then it is necessary to process that knowledge so that meaningful and correct outputs or decisions are achieved by the CNR. This processing is referred to as "reasoning on the information". Many reasoning engines exist, such as those used in classical expert systems, neural networks, genetic reasoning or fuzzy logic. For example, fuzzy logic has reasoning engines such as Mamdani.

Therefore, there is a need in the art for a network configurations and nodes that address the different problems associated with the use of CNRs in cognitive networks. The present invention introduces a network approach that makes use of a Dynamic Networking Spectrum Reuse Transceiver ("DNSRT")—a CNR that resolves the foregoing problems as will be described in the following sections.

SUMMARY OF THE INVENTION

The present invention includes systems and methods for improved performance in a mobile ad hoc network. The teachings disclosed herein may be applied to other types of networks such as mesh networks and sensor networks. In one embodiment of the present invention, some of the network services functionality of a MANET is implemented in the PHY or MAC Layer of the DNSRT. This off-load of functionality allows for more efficient communication among the DNSRT nodes. In another embodiment of the present invention, a DNSRT includes a reasoning engine for processing knowledge obtained about the DNSRT nodes comprising the network. As will be discussed in detail, the reasoning engine is primarily used for controlling the DNSRT itself and not primarily for routing, although information provided by the reasoning engine may be used for routing purposes.

The DNSRT network of the present invention implements a route optimization strategy that involves the dynamic collection and distribution of the spectrum topology from what is referred to herein as a Multi-Association Relay Spectrum (MARS) set member to other members of a local A/N. A MARS is elected on the basis of the number of available strict 2-hop neighbor atomic channels from a given source A/N, and does not necessarily rely on the number of strict 2-hop neighbor nodes. A MARS set member is key to the transport of all user and most network control traffic throughout the DNSRT network.

The present invention implements several techniques that enable the efficient functioning of a network (e.g., MANET) of DNSRTs. For example, the traffic flow is improved by (1) the offloading of some of the network services function onto the DNSRTs, (2) electing MARS set members that determine a frequency hopping sequence that allows the efficient incorporation of cognitive radios in a MANET, and (3) using a reasoning engine to harvest available spectrum for the DNSRTs to communicate over.

In view of the foregoing background, it is therefore an object of the present invention to provide the technology for creating a cognitive networking radio using a unique spectrum sensing cognitive radio true multichannel technology. The approach and set of mechanisms of this invention form the foundation for networking with cognitive radios in a dynamic network topology, such as MANET. This foundation may be used to support all associated network services such as routing, security, network management, billing, Quality of Service (QoS) and mobility management. Conventional MANET approaches do not work because they focus on the wrong aspects of a cognitive network in which the natural environment and compliance with government rules/regulations come into play to affect the operation of the CR and CNR. Instead, the spectrum-focused approach of the present invention is put forward as the basis to overcome the networking difficulties in a dynamic, cognitive radio-based network.

This and other objects, features, and advantages in accordance with the present invention are provided by a network and method whose network services utilize a PHY Layer and MAC Layer functionality core framework that allows spectrum sensing-based CRs to form a true multichannel MANET, mesh or wireless sensor network ("WSN") of CNRs while avoiding interfering with primary or higher priority secondary users of the frequency spectrum. The network of CNRs includes a plurality of wireless mobile nodes and a plurality of wireless communication links interconnecting the nodes. One method of the present invention includes determining a set of available channels for every association of nodes or individual nodes in the network for the purpose of performing network services; executing network services over said available channels; performing true multichannel cross-layer network services; flooding any type of network traffic through the network over a subset of DNSRT nodes and/or associations using an optimized, available channel-based mechanism; monitoring the members of each available channel set across the network; distributing networking functionality across more than one available channel from the identified members of channel sets; and incorporation of intelligent networking capabilities.

DESCRIPTION OF THE INVENTION

Definitions

Figure 1:
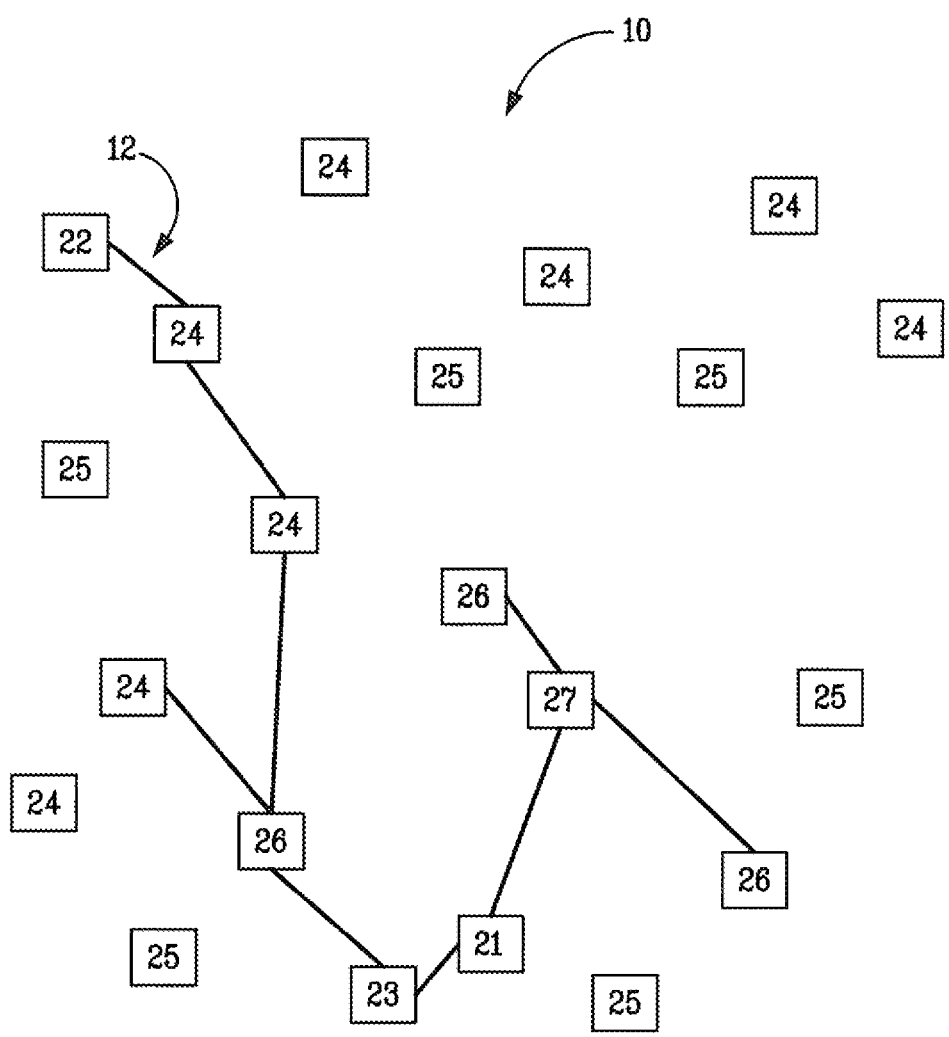
FIG. 1 illustrates one embodiment of a DNSRT network in accordance with the present invention.

This section covers definitions of terms or phrases used throughout the present application in describing the embodiments of the present invention. The DETAILED DESCRIPTION OF THE PREFERRED EMBODIMENTS section includes more detailed discussions of at least some of these terms.

Ad hoc associations/nodes ("A/Ns")—A/Ns may be defined as nodes in an association within an ad hoc network.

Area—An area in a DNSRT network may be defined by a set of physical coordinates (relative or absolute) or by distance metrics around some point, typically radiating.

Association—An association of nodes may be defined as a grouping of network nodes bound together by a specific relationship or set of rules. Associations' relationships or rule sets may be created using any criteria of importance to the user or network. Relationships and rule sets may change over time and therefore so does the nature of the associations they may be applied to. Associations as a whole within other associations may have a specific relationship to other members of the larger association as well as a different relationship common to the members of the smaller association. A multicast group is an exemplary association.

Atomic Channel (AC)—An atomic channel may be defined as the most basic, smallest, operational channel bandwidth of the CNRs in the network. Wider channels used by the CNRs are multiples of this and are formed from assembling multiple ACs. Examples of ACs are 3.125 KHz, 6.25 KHz, 12.5 KHz, 1.0 MHz, 5 MHz, 20 MHz, 1.0 GHz, etc. The notion of an atomic channel also applies to networks in which at least two (2) of the CNRs are capable of simultaneously operating over channels of which not all are of the same bandwidth and in which some channels of these inhomogeneous channel bandwidth CNRs are not multiples of the smallest channel bandwidth of these CNRs. In that situation, distinct, multiple ACs exist in the same physical network as well as in this type of CNR. For example, this inhomogeneous bandwidth is useful where some CNRs are capable of simultaneously communicating over both relatively narrowband and broadband spectrum regions. The DNSRTs of the present invention may be part of a network with multiple AC bandwidths.

Available Channel—An available channel is any channel with atomic channel bandwidth that is not occupied at the time of interest by either a primary user or a higher priority secondary user.

Dynamic Networking Spectrum Reuse Transceiver—A DNSRT may be defined as a cognitive networking radio with spectrum reuse and spectrum discovery functionality such as that of transceivers disclosed in U.S. Pat. No. 7,457,295 or U.S. Patent Publication No. 20090074033, incorporated herein by reference, and configured to implement a reasoning engine, a MARS election algorithm, and/or a subset of network services.

Frequency-hopping sequence—Frequency-hopping sequence may be defined as the sequence of bits fed into a transmitter or receiver to direct transmission or tuning on a given frequency channel for a given period of time.

Frequency Topology ($\upsilon$T)—The frequency or spectrum topology of a network may be defined as the full set of available frequencies in which some form of allowable RF or wireless communications may occur.
  a. Dynamic Frequency Topology (D$\upsilon$T)—D$\upsilon$T may be defined as a frequency topology which changes with time.
  b. Heterogeneous Frequency Topology ($\eta\upsilon$T)—$\eta\upsilon$T may be defined as a frequency topology which changes over a specified physical area of communication for a specified interval of time.
  c. Homogeneous Frequency Topology (H$\upsilon$T)—H$\upsilon$T may be defined as a frequency topology which is constant over a specified physical area of communication for a specified interval of time.

"Hopping" or "nodal hopping" may be defined as ad hoc message passing.

Hub—A hub may be defined as the node or association of nodes that is the functional center of some type of activity in the network. In a DNSRT network, a hub may be responsible for collecting spectrum topology information and disseminating this information to the other nodes in the local spectrum association.

Knowledge Space—When data has been mapped, or transformed, from being of the type useful for numerical processing to forms that are used by reasoning engines to make decisions, then it is said that information has been transformed from data space to knowledge space. An example of knowledge space is the set of fuzzy logic variables and rules that would be used by a fuzzy logic reasoning engine. Another example is the set of extracted feature vectors in a neural network.

Maximum Allowable Set (MAS)—The MAS may be defined as the "AND" (intersection) of the number of available channels from each A/N participating in the spectrum discovery process at the time of the request for the determination of the MARS set.

Multi-Association Relay—Spectrum (MARS)—MARS may be defined as a group of nodes, each node in a local A/N within the DNSRT network, that dynamically collects and distributes the spectrum topology to other members of their local A/Ns. A MARS set member is key to the transport of all user and most network control traffic throughout the network. MARS set members communicate with each other and with other nodes or A/Ns. A MARS set member is elected based on the number of available channels that each of its neighbors has available to communicate with other neighbors.

Multipoint Relay (MPR)—A MPR may be defined as one member of the minimum set of nodes required to reach all two-hop neighbors of a given source node that is flooding the network with network topology information. That is, each MPR is a one-hop neighbor of the flooding source and is chosen to "see" the most two-hop nodes from the source. The strict symmetric one-hop neighbor set of each MPR has zero intersection with all other strict symmetric one-hop neighbor sets of its peer MPR set (i.e., there are nodes in the network that are jointly shared by more than one MPR set). MPR is one optimization of the classical link state flooding process, which in any dynamic topology network would quickly overwhelm the network with overhead traffic from flooding.

Neighbor—A neighbor of an A/N may be defined as that A/N which communicates over one or more available ACs. Physical distance need not be directly involved in the specification of what is a "neighbor" although indirectly, the distance between two associations/nodes may have some bearing on this. However, other things such as policy (e.g., FCC spectrum use policy) may prevent communications over certain spectrum which otherwise would make it free for secondary use.

Network Topology—Network topology may be defined as the interconnection layout of the nodes of a network. The most fundamental type of topology in a wireless network is the set of frequencies (spectrum) that any two nodes/associations may communicate over.

Qualified—This term, as used in this application, may be defined as any quantity such as a set of ACs or topology that meets the networking requirements for whatever set of applications the network is being used. These requirements can be security, QoS, battery, mobility or any other category needed to transport control, management, end user data or other traffic across the network.

Sensor Network—A sensor network may be defined as a plurality of spatially distributed devices that use sensors to monitor physical or environmental conditions in a cooperative fashion. The network interconnections may be wireless.

Strict 2-Hop Neighbor—A strict 2-hop neighbor may be defined as any neighbor of an A/N that is not itself or one of its 1-hop neighbors.

Symmetric Neighbor—A symmetric neighbor may be defined as any neighbor of an A/N that has confirmed or expected bi-directional links between itself and the A/N.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

As will be appreciated by those skilled in the art, portions of the present invention may be embodied as a method, data processing system, or computer program product. Accordingly, these portions of the present invention may take the form of an entirely hardware embodiment, an entirely software embodiment, or an embodiment combining software and hardware aspects. Furthermore, portions of the present invention may be implemented as a computer program product on a computer-usable storage medium having computer readable program code on the medium. Any suitable computer readable medium may be utilized including, but not limited to, static and dynamic storage devices, hard disks, optical storage devices, and magnetic storage devices.

The present invention is described below with reference to illustrations of methods, systems, and computer program products according to embodiments of the invention. It will be understood that blocks of the illustrations, and combinations of blocks in the illustrations, can be implemented by computer program instructions, hardware devices, or a combination of both. These computer program instructions may be provided to a processor of a general purpose computer, special purpose computer, or other programmable data processing apparatus to produce a machine, such that the instructions, which execute via the processor of the computer or other programmable data processing apparatus, implement the functions specified in the block or blocks.

This application enables the implementation of a cognitive networking radio by using spectrum sensing cognitive radio technology. The unifying network framework of the present invention, the DNSRT network, includes, but is not limited to MANETs, sensor networks (SenNets) and general mesh networks. In one embodiment of the present invention, the default mode of operation is MANET with point-to-point and point-to-multipoint modes as special cases within that default mode of operation. The focus of the DNSRT network is on providing intelligent, mobile (0–N distance units/time) and full/partial mesh connectivity.

The DNSRTs of the present invention take advantage of unique true multichannel, interference-avoiding spectrum sensing technology in its networking capabilities. The term "true multichannel" refers to the ability to combine the individual channels in a set of available channels into one or more organized channels, resulting in a lesser number of channels, of each of equal or greater bandwidth than its constituent available channels. An exemplary system embodying a similar capability is described in U.S. patent application Ser. No. 11/532,306, which is incorporated herein by reference. Interference-avoiding refers to the ability to move away from a channel or set of channels that are currently being occupied by either a primary user or a higher priority secondary user. Any variation on the "true multichannel, interference-avoiding" spectrum sensing technology maximizes the application of DNSRTs.

The DNSRT may be defined as a PHY Layer radio device that takes a broad, network systems approach and whose core functionality off-loads some of the tasks of routing and other network functionality/services in a fundamentally new way into network service-agnostic cognitive networking radio core functions. This off-loading of tasks to DNSRT simplifies and speeds up MANET (also mesh, sensor, etc.) network services. The off-loaded tasks are absorbed into the normal operation of the CNRs into a kernel (core) set of radio control and management tasks common to many or all network services. Another way of stating this is that certain functionality which had been considered in the networking realm is now recast as part of the radio control and management realm. Whatever functionality doesn't get recast or off-loaded becomes the new, redefined cross-layer MANET network service. A DNSRT-local knowledge base processed by its reasoning engine connects and optimizes any given DNSRT network service-agnostic core function to a given network service. This is so because MANET is by nature highly cross-layer and network services such as routing have to directly tap into the cognitive networking radio device information (Physical Layer) in order to optimally route traffic over cognitive radios. For CRs or CNRs that do not have the capabilities of the DNSRT of the present invention, it will be very difficult or impossible for MANET routing, QoS and other network services to effectively operate in heterogeneous frequency topologies. This is even more pronounced in dynamic heterogeneous frequency topologies. Another benefit of the present invention is that the DNSRT network reduces some of the time-consuming tasks that each network service would otherwise incur.

Various entities that comprise a DNSRT network will now be defined. It is to be understood that the term "node" may be replaced by "association" in accordance with this invention without any loss of generality. These nodes are depicted in FIG. 1 in accordance with one embodiment of the present invention. In FIG. 1, the DNSRT network 10 is comprised of several types (e.g., source, destination, MARS elected member, etc.) of nodes 21, 22, 23, 24, 25, 26 and 27. The nodes not interconnected with link 12 are not part of the DNSRT network in any given instance of time (i.e., nodes are constantly coming in and leaving the network), but may join the network.

The source node 21 is the node originating transmissions with the intended communication message. Node 22 is the intended destination of said transmissions. Node 23 is 1-hop distant from the source node 21 and also a member of the current MARS set for the source node 21. Nodes 24 are other nodes in the DNSRT network 10 with no special significance to the DNSRT network 10 except that a subset of these nodes 24 may be intermediate receivers of the transmissions from the source node 21 to the intended destination 22. Nodes 26 are 2-hop neighbors of the source node 21. Nodes 25 are other types of transmitting nodes, possibly primary users or higher priority secondary users in the same spectrum band as 21, 22, 23, 24 and 26 nodes.

Referring now to FIG. 1, a method for operating a DNSRT network 10, e.g., by providing a core of network services, will now be described. The network 10 includes a plurality of mobile nodes 21, 22, 23, 24, 25, 26 and 27 including the source node 21 and the destination node 22 with intermediate nodes therebetween. The nodes 23, 24, 25, 26 and 27, such as DNSRT-enabled laptop computers, personal digital assistants (PDAs) or mobile radios, are connected by wireless communication links 12 as would be appreciated by the skilled artisan. In the illustrated embodiment, Node 23 is an elected MARS node for the source node 21 based on its coverage or reachability to 2-hop nodes 26, i.e, based on the number of available channels that each of its neighbors has available to communicate with other neighbors. Node 27 is a non-MARS 1-hop node from the source 21. Nodes 25 are various types of RF sources that must be spectrally avoided by the transmissions from source node 21 or by other DNSRT nodes during the operation of these RF sources. Nodes 25 may or may not be DNSRT-enabled.

Figure 6:
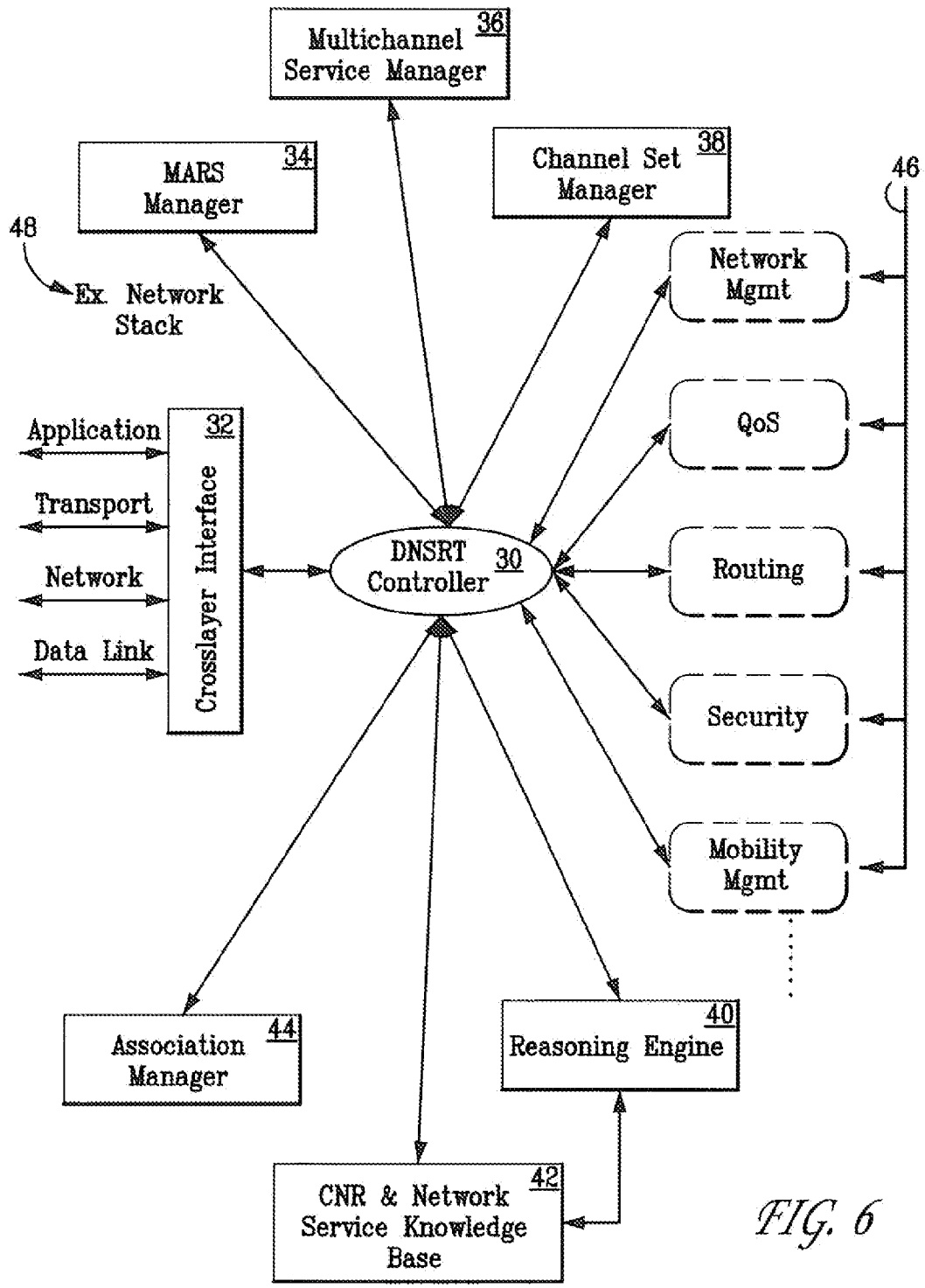
FIG. 6 illustrates general DNSRT core functionality and service architecture in accordance with one embodiment of the present invention.

A system aspect of the invention will now be described with further reference to FIGS. 1 and 6. As discussed, the DNSRT network 10 has a plurality of wireless mobile nodes 21, 22, 23, 24, 25, 26 and 27 and a plurality of wireless communication links 12 connecting the nodes together. Each mobile DNSRT node 21, 22, 23, 24, 25, 26 and 27 includes a Controller 30 that controls and coordinates the DNSRT core services; a Cross-layer Interface 32 that the controller 30 uses to communicate with whatever network stack 48 is present with said network stack 48 also outside of the DNSRT core; a MARS Manager 34 that controls and manages the MARS election process and any subsequent modifications of a given MARS set; a Multichannel Service Manager 36 which distributes any given DNSRT network service across the available local channel set; a Channel Set Manager 38 which manages and controls the contents of any given local channel set; a Reasoning Engine 40 which accepts inputs coded into such forms as crisp or fuzzy logic, temporal data, etc. and reasons on these inputs over the CNR & Network Service Knowledge Base 42; CNR & Network Service Knowledge Base 42 which contains both Cognitive Networking Radio device information and specific DNSRT network service information in the forms of pure data and knowledge coded in such forms as IF-THEN rules or temporally-coded data; an Association Manager 44 that manages and controls the contents of local associations. The DNSRT Controller 30 interfaces with the controllers for the various DNSRT network services 46 which are outside the DNSRT core (shown in dashed boxes).

The technical focus of this application is on providing an optimized cross-layer MANET or mesh networking approach. The general core functionality/service architecture of DNSRT is built upon the premise of identifying and defining the components of DNSRT network services such that these components and their external parameters are not dependent upon any particular application or general protocol stack. In one embodiment of the present invention, this defined generic set of external DNSRT service interface parameters require whatever protocol stack and application is chosen by the applications systems design to conform to the DNSRT interface specification. Such conformation could require the specific applications system to create these parameters through a custom parameter conversion or extraction process. The architecture of each major component is kept separate from the architecture of DNSRT so as to further preserve this independence.

Figure 7:
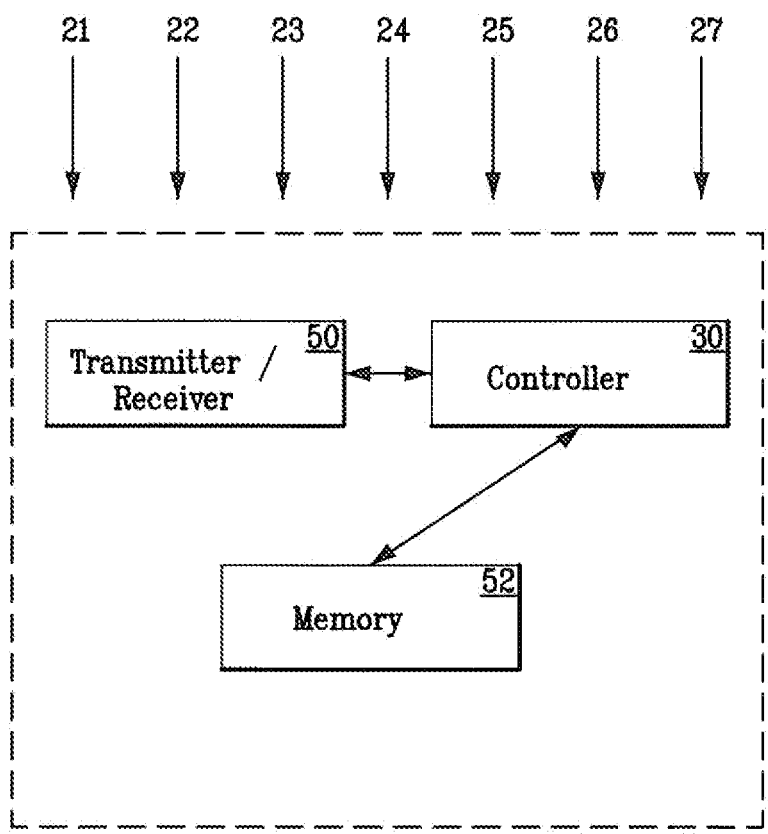
FIG. 7 illustrates a DNSRT system device architecture in accordance with one embodiment of the present invention.

A system aspect of the invention will now be described with further reference to FIG. 7. As discussed, the DNSRT network 10 has a plurality of wireless mobile nodes 21, 22, 23, 24, 25, 26 and 27 and a plurality of wireless communication links 12 connecting the nodes together. Each DNRTS-enabled mobile node 21, 22, 23, 24, 25, 26 and 27 includes a controller 30 that has a communications device 50 to wirelessly communicate with other nodes of the plurality of DNSRT nodes via the wireless communication links 12. Also, a memory 52 may be included as part of the controller 30 or in connection with the controller. In one embodiment each node in the DNSRT network may include a radio such as that disclosed in U.S. Pat. No. 7,457,295 or U.S. Patent Publication No. 20090074033, incorporated herein by reference, programmed to implement the functionality disclosed in the present invention.

Metamorphic Nodes and the Local Spectrum Topology

A node with no DNSRT capabilities (e.g., node 25) is treated as external to the DNSRT network and would use at least one of the DNSRT nodes as a gateway into the DNSRT network. In one embodiment, the present invention requires each DNSRT node in the network to transform between remote and hub as the MANET reorganizes itself. This transformation—or metamorphosis—is initiated and executed under the direction and control of the local association of DNSRT nodes. The approach to forming an operational DNSRT network involves setting multi-association relays for spectrum (MARS). Embodiments of the invention show a straightforward path to dynamically electing the "hubs" responsible for coordinating and dispensing information about the local "spectrum topology" and any other type of network information such as quality of service (QoS). These hubs are also referred to herein as MARS set members. The present invention covers embodiments of single-node hubs and as well as generalized association hubs.

MANET/Mesh Routing, Flooding and Dynamic Spectrum Topology

MANET routing technology has a previously-developed protocol currently on track for IETF (Internet Engineering Task Force) standardization called Optimal Link State Routing (OLSR). In OLSR, an elected node, called a Multi-Point Relay ("MPR"), collects and distributes link state topology information using regularly-spaced Hello beacons. Hello beacons may be defined as periodic or aperiodic short transmissions from a node that let other nodes know the beacon-transmitting node is there. This link state topology information tells whether a link currently exists between given pairs of nodes in the local (one-hop) neighborhood of the MPR and in the two-hop neighborhood of the flooding source node. A flooding source node may be defined as the node which starts the flooding process. The flooding process may be defined as a service within a network to locate the receiver inside the network so that end-to-end communication can take place. As the network dynamics change the connectivity of a previously-connected local group of nodes, a new node is then elected as the MPR for those nodes at the two-hop distance from a given flooding source node. Hypothetically, every node in a MANET could be an MPR for some node that originates a flooding operation.

Applying OLSR or even MPR techniques to successfully operate a network of cognitive radios is not a workable solution.

First, OLSR is strictly a MANET routing protocol. Its only purpose is to efficiently route traffic of any type through the network using some subset of the MPRs as intermediate or destination nodes as needed. Regardless of any other type of traffic that is passed along routes involving MPRs, the connectivity of the network is regularly updated by monitoring neighbor beacons and flooded throughout the network over MPRs. OLSR has no mechanism for spectrum discovery, control or management, nor can it incorporate dynamic spectrum data from other sources into its routing decisions.

Second, a cognitive radio's primary concern is about the usability of spectrum in its neighborhood—not about the network connectivity to the nodes around it. That is, one cognitive radio could conceptually connect to another one, but may be prevented from doing so because either FCC or other government imposed regulations prevent interference with a primary user, or communications would be too degraded due to interference from another secondary user. Once the usability of the spectrum is established, network connectivity can then be addressed by whatever higher level protocols are in place—assuming they can work with a dynamically-changing frequency environment. This second reason is why neither MPRs nor OLSR are applicable to a network of cognitive radios. Since the FCC is very strict about secondary users interfering with primary users, this makes OLSR and other similar routing techniques and optimized flooding techniques such as MPR insufficient or even irrelevant for spectrum discovery and interference mitigation problems.

The network of DNSRTs disclosed in the present application solves all of these problems and applies to all of the following uses of radio communications:
  Secondary use CRs or CNRs in licensed bands with non-cognitive radio primary users
  General operation of CRs or CNRs in unlicensed bands
  General operation of CRs or CNRs in bands with similarly licensed radios (other cognitive radios and non-cognitive radios) as a secondary or primary user Applying current CR available spectrum discovery, allocation and management techniques is also insufficient to help optimize the MANET (mesh) routing process. There is no routing functionality involved in this spectrum discovery process.

The present invention exploits the cross-layer nature of MANET and of other wireless networks to bring cognitive radio's main functionality (spectrum discovery and usage) together with MANET (or mesh) routing and other network services to solve the problems in the art. Specifically, in one embodiment of the invention, some aspects of MANET routing, QoS monitoring, security, mobility management, network management and power management functionality are incorporated into the dynamic spectrum handling functionality of the DNSRT. Parts of other network services traditionally incorporated into the actual network service may also be incorporated in DNSRT. DNSRT implements highly-intelligent radio control and a management core that enables simpler and higher quality cognitive networking—it provides a common core of capabilities (low level services) that are used by routing, QoS, security and other network services to perform the actual networking.

The present invention aims at—and achieves—moving full networking capabilities as close to the radio hardware as possible. There are several significant benefits derived from shifting network functionality to the DNSRT (Physical Layer and MAC Layers of the network). First, this shifting effectively enables the simplification of various MANET cross-layer services (routing, QoS, power management, mobility management, network management and security) and their accompanying protocols. Second, pushing these tasks down the stack into the cognitive radio greatly speeds up these network services and completes the creation of a CNR. Third, the reliability of network services is increased since the quicker response enabled by the CNR allows network services in the network to take whatever actions are necessary earlier without the delays incurred by middle and higher layer detection and processing of those events.

While local-star topologies may be desired for distributing spectral topology information, existing MANET routing and flooding techniques, including those of OLSR, are not appropriate due to the previously-discussed limitations of techniques such as OLSR and its accompanying MPR technology. The present invention does not require a star-topology, as some of the routing functionality may be pushed down into a combination of PHY-MAC-Network cross-layer interaction. Star topologies are old network topologies well-known for their limitations, especially in a dynamic network. For example, in a star topology the PHY Layer does not talk to the Network Layer and vice versa. Pushing down routing functionality into a combination of PHY-MAC-Network cross-layer has the effect of significantly speeding up and making possible the routing and general dissemination of information within the DNSRT network. The same applies to QoS, network management and other network services although not necessarily involving the Network Layer.

Cross-Layer Networking

MANET and other types of wireless mobile networks rely on cross-layer communications, a departure from the traditional communication flow up and down the OSI and TCP/IP stacks. Routing in a MANET will not work without routing algorithms tapping into such device-specific (Physical Layer) information as antenna coverage properties, mobility of the node, node battery power capacity, utilization rate and recharge rate. This implies that for optimal or even minimal performance, network services such as routing, QoS, mobility management, network management and security are required to interact directly with the radio at the PHY and lower MAC Layers.

For example, it is now well-known in MANET routing that in order to improve the probability of choosing "longer term" stable routes involving nodes with batteries, it is necessary to consider the battery charge capacity and remaining charge in the battery. Otherwise, routes with solid links between the nodes, but with some nodes running out of power too early, could be chosen to carry high-priority and long-duration traffic. In such a situation, if the network management service had already provisioned its remaining available subset of nodes for other users, there might not be enough time to quickly reprovision these other nodes in time to maintain the QoS agreed to in the service level agreement with that customer.

In the present invention, these network services interact with upper layers including the Application Layer to incorporate information such as location of nodes and scheduled downtime of nodes. The DNSRTs of the present invention handle data inputs normally associated with one or more layers in the OSI or TCP/IP stacks.

Figure 2:
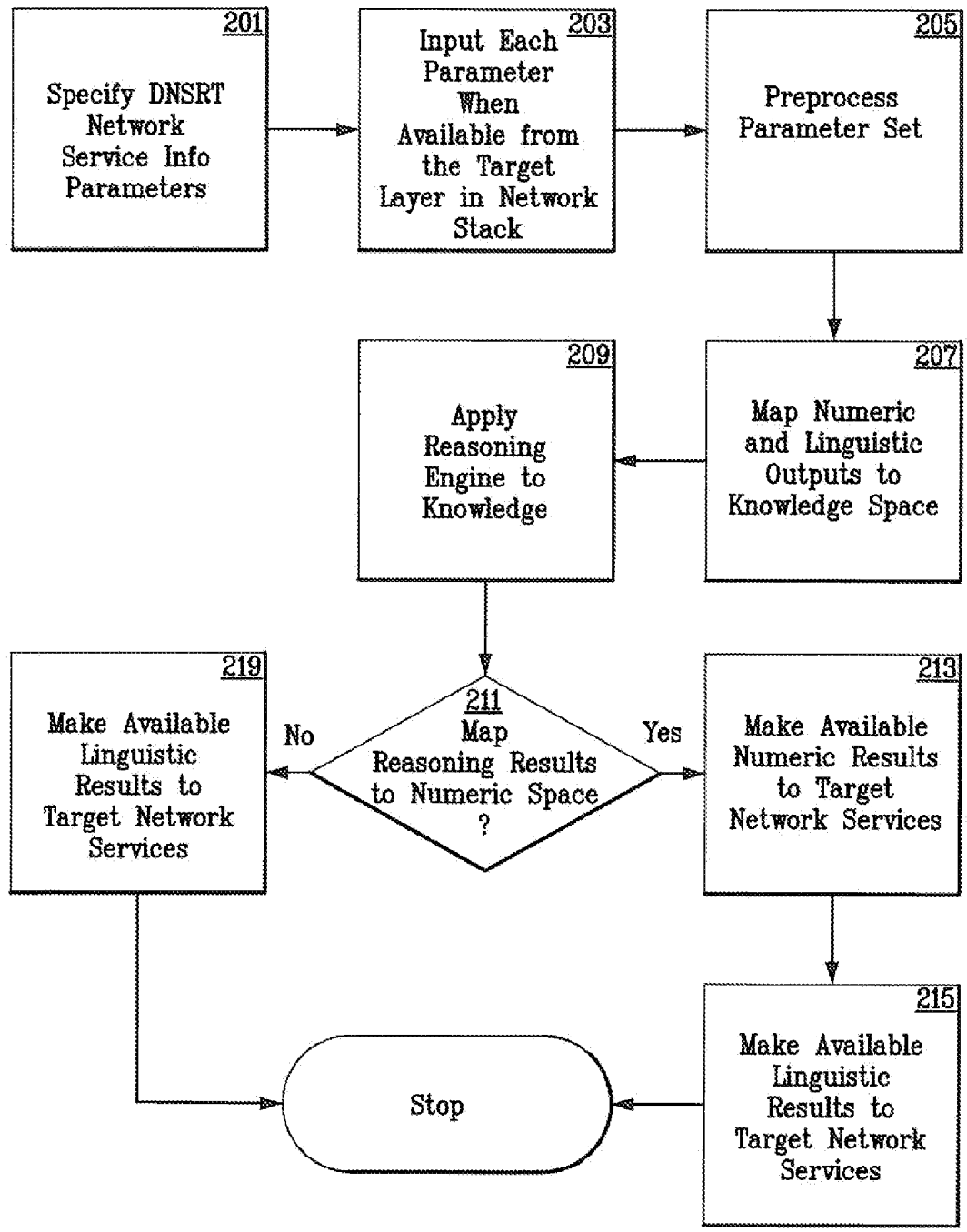
FIG. 2 illustrates a flow chart of the cross-layer communication operation of a DNSRT network in accordance with the present invention.

FIG. 2 illustrates the steps of a method for specifying, transforming and making available information from any layer in the network stack to any network service, function or device to include the PHY Layer, MAC Layer and any upper layer in accordance with one embodiment of the present invention. The DNSRT includes a reasoning engine to assist in the management and control of the transceivers. The following sequence of steps generally describes a method that may be implemented by DNSRTs in handling cross-layer information:

1. Specify information parameters (e.g., node location, scheduled downtime of node, etc.) to be used by the selected DNSRT network service (step 201).

2. Input each parameter into the DNSRT when available individually or as a group from the generating network layers (step 203).

3. Preprocess the parameter set as needed (step 205). The DNSRT may utilize any processing technique that is desired by the system developer. The fusion of multiple input parameters may take place in this step. Also, parameters from the various network layers may be either numeric or non-numeric, e.g., linguistic. One example of preprocessing is the application of smoothing function to remove some of the variability of the data. Another example is the application of linear trending techniques to determine the expected rate of change of one or more input parameters over the near-term.

4. Map the numeric or linguistic outputs from unprocessed or preprocessed (if performed) information to knowledge space (step 207). Again, fusion of the parameters may take place before this mapping occurs.

5. Operate on the knowledge space inputs by using a reasoning engine such as Mamdani if fuzzy logic is being used or backpropagation if a neural network is used as the reasoning engine (step 209). In one embodiment, the DNSRT's default mode of operation uses a fuzzy logic reasoning engine to assist with cognitive radio control and management. That is, the intelligent reasoning engine is used to control and manage the actual radio or association of radios, and not the network that connects the radios. The network services using a set of DNSRTs utilize networking schemes on top of the CNR capabilities of these devices to effect the actual network.

6. Optionally map outputs from the reasoning engine back to numeric space as needed to provide the management and control data needed by network services (steps 211 and 213). This optional step may be carried out should a given network service such as routing or QoS have the capability to perform its functions using knowledge (such as linguistic rules). In a dynamic network, the more information about the capabilities and state of the physical device (radio) that a network service has, the better the network service will perform. If both linguistic and numeric information are available, then both are provided to network services.

7. The given network service then performs its function using either information in knowledge space (step 219 or 215) or in "normal" (numeric) space (step 213). This can be said to be a cross-layer networking method because of the information inputs coming from multiple layers in the network stack and because of the fusion processes occurring at different points in this sequence of steps.

One of the most pervasive qualities of the DNSRT of the present invention in a CNR network is the ability to enable high performance QoS, Security, Routing, Network Management, Mobility Management and other network services through its spectrum discovery and use/reuse capabilities. The DNSRT achieves this by incorporating network service-affecting parameters into unified metrics that the CNR may then use to choose the subset of channels from the local available universe to make available to network services tasks further up the stack. The DNSRT network uses this process to endow the DNSRT with the level of intelligence (cognitive ability) required by the users and the network services. This is one of the major capabilities that distinguishes the DNSRT network approach from others for delivering high performance network services.

Cross-Layer Interfaces

A hook may be defined as an interface provided in packaged code that allows a programmer to insert customized programming. Typically, hooks are provided for a stated purpose and are documented for the programmer. The ability of functions and services to be made cross-layer may require intra-service/function cross-layer hooks to export and import the required information from the parts of those same functions/services spread across the various network layers. Inter-service/functions cross-layer hooks may be used so that QoS can interact with mobility management and routing services in order to reserve properly-positioned selected nodes (CNRs, for example) to provide the level of connectivity required to support near-guaranteed delivery classes of service.

In one embodiment, the DNSRT's MAC contains hooks into its MACs to export upon request any and all available Physical Layer parameters of potential use to the middle and upper network layers. The reverse is also true in that a DNSRT's MAC can pass certain higher stack level information to the radio's Physical Layer processing engine so the radio understands what requirements user applications and network services place on it. In one embodiment of the present invention, the DNSRT makes all desired parameters available to any network layer. Alternatively the DNSRT makes all desired parameters available to at least the MAC Layer. The MAC would then pass this information up the "stack" as needed.

Protocols

The DNSRT network of the present invention implements protocols associated with its functioning and configuration. The following list includes some of the protocols along with a description of what they are generally tasked to do:

DNSRT Initialization Protocol (DILP)—This protocol is associated with initial configuration and activation of the DNSRT network including initially configuring each DNSRT plus any other attached devices such as non-DNSRT gateways. Information used for initializing the network may include decision metrics, decision parameters, preconfigured routes (static or dynamic), node addresses, spectrum operating parameters, A/N metrics and parameters.

DNSRT QoS Control Protocol (DQCP)—DQCP is a protocol associated with handling Quality of Service control in a DNSRT network. This protocol is responsible for reserving/unreserving network resources, controlling the number of flows into areas of the network, setting bits in protocol headers governing QoS, etc.

DNSRT QoS Management Protocol (DQMP)—DQMP is a protocol associated with handling Quality of Service management in a DNSRT network. This protocol carries queries for monitoring the actual QoS performance through different devices and configures each device with the required QoS parameters such as the metrics for each class of service supported by a given device.

DNSRT MARS Control Protocol (DTCSP)—DTCSP is a protocol associated with handling MARS control in a DNSRT network. This protocol is responsible for issuing requests to one-hop neighbor A/Ns to collect and send their available spectrum information to the requesting A/N. The expected information to be received by the requestor includes a combination of the number of atomic channels along with contiguous channel maps. This protocol may also send out to other neighbor A/Ns the identities of the elected MARS A/Ns for that particular source A/N.

DNSRT MARS Management Protocol (DMMP)—DMMP is a protocol associated with handling MARS management in a DNSRT network. This protocol carries queries for monitoring the status of a MARS A/N and its member A/Ns (nodes, associations of nodes or associations of associations).

DNSRT Security Control Protocol (DSCP)—DSCP is a protocol associated with handling Security Service control in a DNSRT network. This protocol is responsible for reserving/unreserving network resources, controlling the number of flows into areas of the network, setting bits in protocol headers governing QoS, etc.

DNSRT Security Management Protocol (DSMP)—DSMP is a protocol associated with handling Security Service management in a DNSRT network. This protocol carries queries for monitoring the actual QoS performance through different devices and configures each device with the required QoS parameters such as the metrics for each class of service supported by a given device.

DNSRT Routing Control Protocol (DRCP)—DRCP is a routing master protocol associated with handling Routing Service control in a DNSRT network. This protocol is responsible for reserving/unreserving network resources, controlling the number of flows into areas of the network, setting bits in protocol headers governing QoS, etc.

DNSRT Routing Management Protocol (DRMP)—DRMP is a routing master protocol associated with handling Routing Service management in a DNSRT network. This protocol carries queries for monitoring the actual QoS performance through different devices and configures each device with the required QoS parameters such as the metrics for each class of service supported by a given device.

DNSRT Mobility Management Control Protocol (DM2CP)—DM2CP is a protocol associated with handling Mobility Management Service control in a DNSRT network. This protocol is responsible for reserving/unreserving network resources, controlling the number of flows into areas of the network, setting bits in protocol headers governing QoS, etc.

DNSRT Network Management Control Protocol (DNCP)—DNCP is a protocol associated with handling Network Management Service control in a DNSRT network. This protocol is responsible for reserving/unreserving network resources, controlling the number of flows into areas of the network, setting bits in protocol headers governing QoS, etc. DNSRT is not realized in just a MANET routing, QoS or any other network service or device. DNSRT is realized in a cross-layer radio device that takes a broad, network systems approach and whose core functionality off-loads some of the tasks of routing and other network functionality/services in a fundamentally new network service-agnostic set of cognitive networking radio core functions. These core functions are pushed down into the PHY and MAC Layers—the lower the better. What DNSRT does for MANET (also mesh, sensor, etc) services is simplify and speed up those network services by tapping into the native spectrum discovery and allocation capabilities of various cognitive radios. Some CRs with such capabilities are more advanced than others and may provide the underlying technology base that allows fuller implementations of DNSRT.

Pushing down some of the "traditional" network service tasks, i.e., those without DNSRT technology, enables portions of those services to be subsumed by the CNR's natural spectrum discovery, allocation and usage capabilities. The off-loaded tasks are absorbed into the normal operation of the CNRs into a kernel (core) set of radio control and management tasks common to many or all network services. Another way of stating this is that certain functionality which had been considered in the networking realm is now recast as part of the radio control & management realm. What doesn't get subsumed (recast) becomes the new, redefined cross-layer MANET network service. A DNSRT local knowledge base processed by its reasoning engine connects and optimizes any given DNSRT network service-agnostic core function to a given network service.

MANET is by nature highly cross-layer and network services such as routing directly tap into the cognitive networking radio device information (Physical Layer) in order to optimally route traffic over cognitive radios. If the network of CRs does not have DNSRT capability, then it will be very difficult or impossible for MANET routing, QoS and other network services to effectively operate in heterogeneous frequency topologies. This is even more pronounced in dynamic heterogeneous frequency topologies.

Communicating With Network Nodes and Associations

This section concerns the different tactical methods supported by DNSRT for utilizing the spectrum reuse capabilities of DNSRT radios for communicating with individual or groups of CR nodes (associations in general). DNSRT supports variable single or multi-carrier preamble channels for A/N-to-A/N (inter-A/N) communications. Preamble channels may be defined as a special channel set aside by the network to convey network control and possibly status information to the network. This same capability enables efficient internal (intra)-A/N communications to occur while inter-A/N communications also takes place. This provides flexibility in communications among A/Ns and also allows the preamble transmission power to be spread across more channels and therefore lowers interference with other users with the preamble. Note that the channels do not all have to be the same bandwidth.

Negotiating Non-Interfering Frequency-Hopping Sequences Between Adjacent Ad Hoc Nodes and Associations In accordance with the present invention, if a new ad hoc A/N of DNSRTs forms adjacent to another ad hoc A/N of DNSRTs, one of the following conditions may be imposed by the DNSRT network, depending on the commitment level of the source of the transmissions when trying to reach the intended destination (i.e., final recipient of the transmitted information).

1. Adjacent A/Ns are forced to be or automatically and dynamically determined to be forbidden to communicate with each other. The new A/N may likely have a new, negotiated orthogonal frequency-hopping sequence depending on the commitment level and the availability of a new space in the spectrum to which the new A/N can move, and/or 2. Adjacent A/Ns are forced to be, or are automatically and dynamically determined to be, forbidden to communicate with each other. The new A/N would autonomously migrate to unused space (withdraw from busy space).

3. Adjacent A/Ns are assumed to be, or are automatically and dynamically determined to be, allowed to communicate with each other. This third condition enables network connections to be established between adjacent A/Ns of cognitive radios such that adjacent A/Ns have communication frequencies in common with each other. The MARS election process described in this application may be used as a mechanism for supporting this frequency-hopping sequence determination selection.

These three commitment levels or conditions are not mutually exclusive. At least one of the first two configurations works closely together with the third in order for MANET or general mobile mesh networking to not only perform the usual networking functions and services, but also to meet stringent non-interference criteria such as, for example, that required by the FCC. The first two play significant roles when using the DNSRT spectrum reuse capabilities to limit the intermediate A/N routing choices using Physical Layer avoidance of the restricted frequencies (spectral non-interference). The third configuration comes into play after the allowable set of frequencies at the MARS or source A/N has been determined.

The process for the second configuration relates to the spectrum reuse capabilities of the DNSTR. The cognizance of the transceiver of the present invention shrinks its band profile to the smallest needed. Its cognizance then forces the transceiver to retreat from other networks to the largest block of contiguous space it can find.

The present invention applies different techniques where, in the allowed spectral band, the DNSRT radios harvest available spectrum for their communications. For example, the DNSRT conducts most of its search for available spectrum in the largest contiguous block of whitespace/grayspace. Alternatively, DNSRT may search in the smallest sufficient block of whitespace/grayspace. Also, the DNSRT may use blocks that are substantially contiguous, meaning that they have sufficient whitespace/grayspace, but in which the transceiver hops more gracefully (e.g., hops cause less disruption and allow more bandwidth for a longer period of time) than other radios can. The choice of which technique to use for any given harvest is made by the DNSRT cognitive reasoning process using its knowledge base and reasoning engine.

To harvest available spectrum, at the A/N level one of two things may occur.

1. At least one of the two A/Ns gives up at least one of its members (nodes) for the purpose of establishing an intermediate link from the source transmission to the intended destination(s) without interfering with the other nodes in the sacrificing A/N; or 2. One or more new nodes is added to one or both of the A/Ns that need to transfer information across that particular A/N. This may result in at least some A/Ns "carrying" auxiliary members for the purpose of maintaining communications across the A/N by non-A/N members without interfering with any of the main members of the A/N.

Somewhat similar to the classic four-color map problem, there is an issue with assigning frequency-hopping sequences to local (one-hop) A/Ns. The problem involves frequency reuse. It is mainly relevant if the hopping sequences are set, but unlike fixed-frequency cell networks, DNSRT can divide sequences into two or more sub-subsequences as needed for some period of time. This can prevent local neighbors of an A/N from interfering with the communications from the given A/N to a subset of its local neighbors and vice versa.

There are also other similarities to the four-color map problem. For example, if there are four QoS classes, these could behave more like fixed frequencies since they would have minimum bandwidth and latency requirements. Depending on the priority of the secondary user communications traffic, it is unlikely that the same set of frequencies (frequency hopping sequence) can remain constant as the traffic is routed from one node to the next through the MANET. This is because the radio would have to avoid interfering with primary users who are operating on different sets of frequencies separating the source and destination of any given communications.

The DNSRT of the present invention handles problems and issues surrounding the assignment of frequency-hopping sequences to one-hop neighbors of any given A/N. For example, the MARS A/Ns' local cognitive reasoning works to help traffic flow in its most optimal manner in connection with providing cross-layer information, as explained above. Also, a DNSRT may readily detect other DNSRTs within its range and map out the channels they are using.

Exchange of Whitespace/Grayspace Information Among Nodes and Associations

In one embodiment of the present invention, each A/N carries its own, independent interference data for that A/N, but also exchanges this data with adjacent A/Ns using the "Whitespace/Grayspace Exchange Protocol" (WGXP). Adjacent A/Ns may operate independently with respect to interference measurements. Some nodes or associations may be geographically common to two or more A/Ns and may migrate from one A/N to another, so it is desirable to report interference to adjacent A/Ns.

In one embodiment, adjacent A/Ns communicate for purposes of management (hopping sequences, interference measurement, device status, etc.) and application data passing. For example, a DNSRT common to both A/Ns can relay messages between A/Ns. Timing is a primary difficulty associated with this case. Both A/Ns operate independently so it is difficult for a common station to know when to listen on one A/N and when to ignore the other. It is also difficult for DNSRTs within an A/N to know when one of its corresponding DNSRT members is distracted (i.e., involved in communication with) by another A/N.

The DNSRT of the present invention may address this timing problem in several ways. For example, DNSRTs may synchronize their TDMA MACs so that there are known times when transceivers listen elsewhere. This fundamentally involves aligning the time slots in each TDMA epoch. Alternatively, the DNSRTs may use GPS as a time reference to define times when messages can be exchanged between A/Ns.

The adjacent A/N communication may also be implemented by adding hooks for cognitive control and management to existing MANET routing methods, but without the full-blown routing functionality included. This makes the routing simpler and much more efficient by removing certain functionality from the MANET routing algorithms and placing it into radio control and management in the Physical and lower MAC Layers. This makes any routing method chosen simpler with a more complicated, but more efficient, Physical and lower MAC Layer capability. Simplification of neighbor discovery and qualification of the neighbor as a node (A/N) in a route from the given source to the given destination is one such capability pushed down below the Network (Internet) Layer.

There are no standard MANET algorithms in existence, although some versions of routing algorithms such as OLSR have several proponents and have been submitted as IETF drafts at different stages in the review and comment process. To incorporate cognizance into an existing MANET algorithm running in a node first requires reaching into the kernel of the MANET algorithm in order to wrest control over how it responds to events. The preferred approach is to write the entire MANET algorithm from scratch with the cognitive control hooks already built into it. The native DNSRT/MANET routing algorithm then builds upon DNSRT's fundamental spectrum reuse approach in this application. DNSRT routing is the subject of another pending patent application, U.S. Patent Provisional Application No. 61/121,797, the disclosure of which is incorporated herein by reference.

In a true MANET, the continuously-changing dynamics make the notions of point-to-point, point-to-multipoint and mesh very ambiguous. At any given instant, any of these possible topologies are likely to be in effect in a given local area of the MANET. Focusing on a general MANET topology as encompassing all of these topologies addresses the problem. Whether one particular topology such as point-to-multipoint for cognizance whitespace/grayspace measurement emerges as the dominant topology is something that is handled automatically by the general MANET topology supported by the DNSRT of the present invention.

The MARS Election Process

MARS and MPR are both route optimization strategies. However, they are considerably different in how they function and how they are elected for their roles in a dynamic network. An MPR is elected on the basis of the number of strict two-hop neighbors from the given source node. Generally, a MARS set member is elected based on the number of available channels that each of its neighbors has available to communicate with other neighbors. In one embodiment of the present invention, a MARS is elected on the basis of the number of available strict 2-hop neighbor atomic channels from the given source A/N, not the number of strict 2-hop neighbor nodes—a fundamentally different criterion with fundamentally different impacts on network decisions. MPRs are elected depending on the number of nodes that they can in turn communicate with, without considering the number of channels these other nodes use to communicate over. MARS members are elected primarily based on the number of available channels that each of their neighbors have available to communicate with their neighbors. Thus, the DNSRT puts the emphasis where it has to be for a dynamically-changing spectrum environment—on the available spectrum (channels). MPR has no ability to compensate for this type of communications environment. MPRs are chosen depending on how many nodes are communicating over a single channel. If the channel becomes unavailable, the election of MPRs is totally crippled, whereas the election of the MARS set continues normally since MARS, which DNSRT depends on, is focused on available spectrum (channels). The DNSRT's unique spectrum sensing cognitive radio technology is what makes the MARS election process of the present invention possible.

Figure 3:
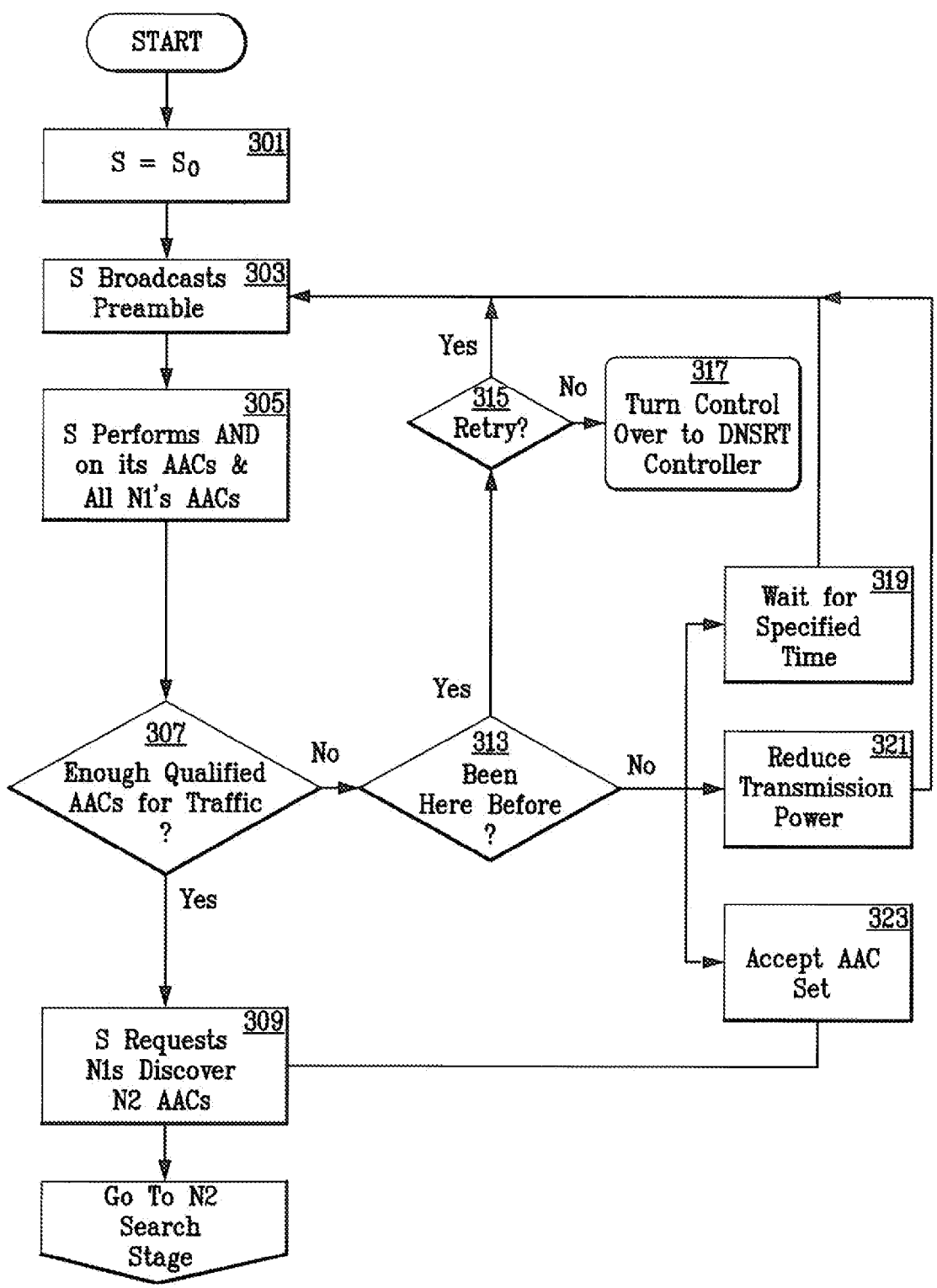
FIGS. 3, 4 and 5 show flowcharts which as a group illustrate the process for electing members of the MARS set in accordance with one embodiment of the present invention.
Figure 4:
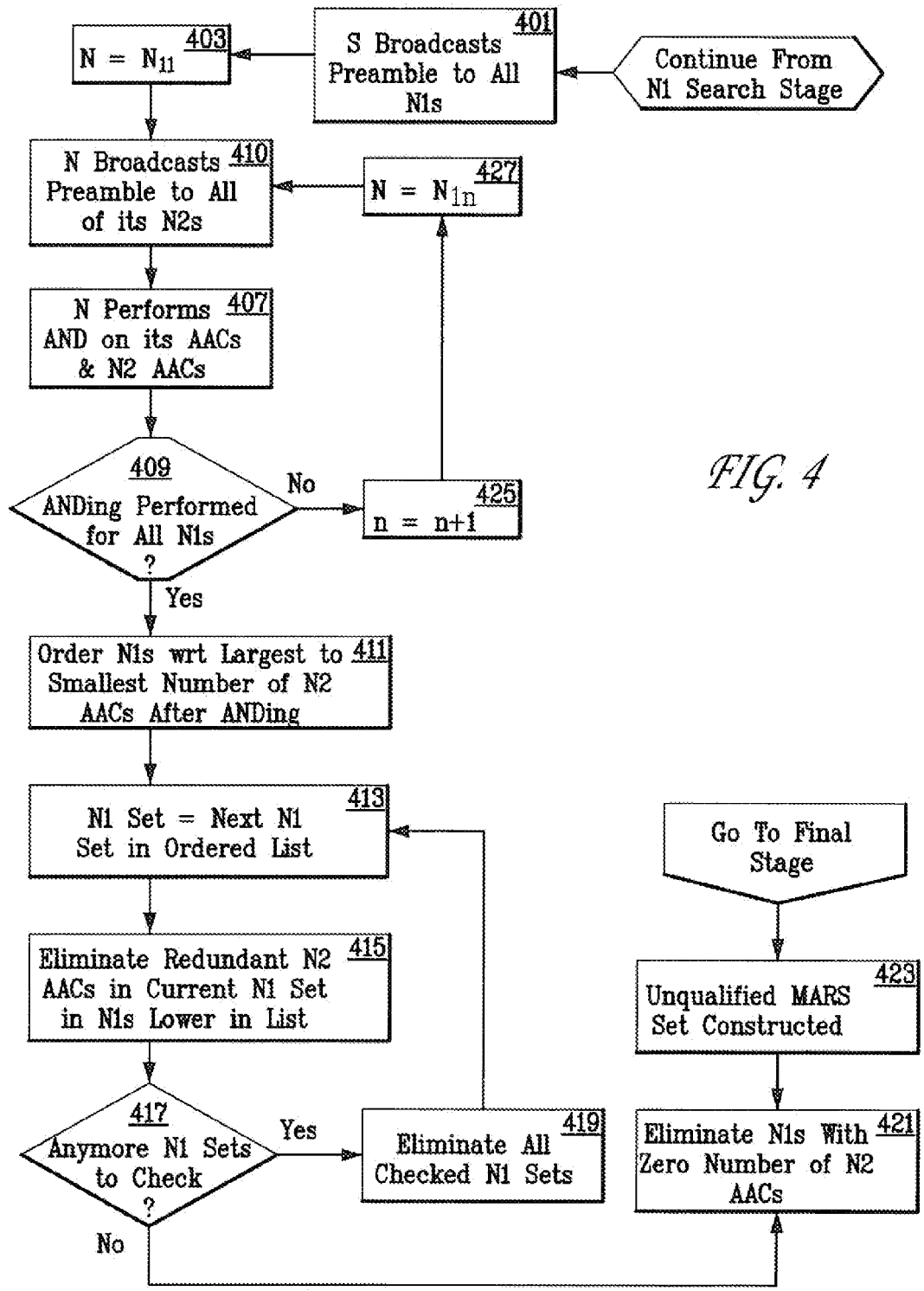
Figure 5:
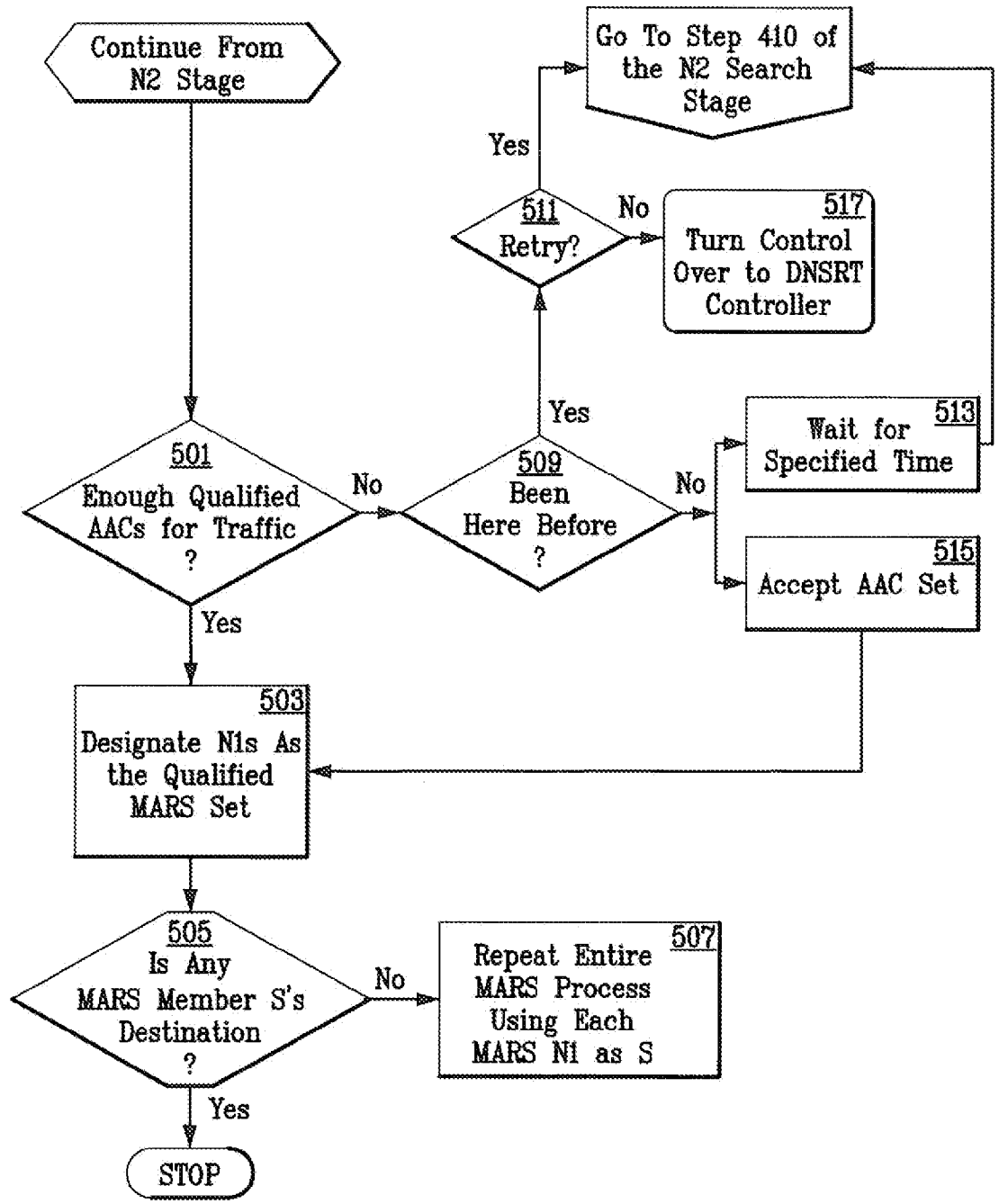

FIGS. 3, 4 and 5 show flowcharts which as a group illustrate the process for electing members of the MARS set in accordance with one embodiment of the present invention. While DNSRT supports other MARS election processes, the following steps constitute the default MARS election process in accordance with one embodiment of the present invention:

N1 and N2 are abbreviations for 1-hop and 2-hop neighbors respectively. S0 is the source A/N that originates the traffic flow.

1. Set S=S0(301).
2. S broadcasts a preamble to discover the available ACs in its 1-hop neighborhood (303).
3. S performs an ANDing operation on the set of available ACs from itself and each of its candidate spectrum N1 s to obtain the common set of N1 ACs (305).
   a. The resultant set of available ACs is recorded by S. These are the ACs used by S to send data and other information to its N1 s.
4. If the qualified number of available ACs is sufficient to meet S's traffic requirements (307), go to step 6. If not, then S has three options. (An available AC is "qualified" based upon other requirements that may be placed upon communication such as QoS metrics, security restrictions, cost to use ($), etc.)
   a. Use the number of ACs under degraded communications conditions (323)
   b. Try again later and go to Step 2(319)
   c. Reduce transmission power (321) and immediately probe its 1-hop neighborhood. This action is undertaken to find a common set by reducing the number of emitters that must be avoided for the time of transmission. The power reduction factor is left to the designer to choose and may be derived through any means, e.g., heuristic, analytical, simulation, etc.
   These three options do not have to be carried out in any particular order. The systems designer may decide the order of carrying these out, or which ones to carry out at all.
5. If one of the above three options is successful (313), then the process will reach Step 6. If not (315), then go to Step 2 or send an error message (317) to S's controller (system choice).
   a. If S's controller receives this error message, the controller decides whether to try again later or take other action. The other action may simply be selecting another route discovery method.
6. Having identified the N1 ACs that it will use, S then broadcasts to those N1 A/Ns a request and a preamble to discover the available N2 ACs for each N1 of S (309, 401).
7. In parallel, each N1 (403, 409, 425, 427) executes the following steps.
   a. N1 broadcasts a preamble to each of the strict N2 s of S to discover the available ACs of all of the strict N2 s of S within RF visibility of the given N1 (410).

b. N1 performs an ANDing operation (407) on the set of available ACs from itself and each of its candidate spectrum N2 s to obtain the common set of ACs for this N1 (407).

i. The resultant set of available ACs is recorded by S.

8. S then starts with the N1 that contains the largest number of available N2 (413) ACs and eliminates redundant available N2 ACs in the other N1 sets (415).

9. Step 8 is repeated (417, 419) for each of the other N1 s starting with the N1 with the second largest number of available N2 ACs and eliminating redundant available N2 ACs in the other N1 sets with equal or smaller numbers of available N2 ACs (421).

10. The MARS set consists of all the N1 s with a non-zero count of available N2 ACs that they can access (423).

11. If the qualified number of available ACs is sufficient (501) to meet S's traffic requirements (for example, the number of messages of a given type per second, or the number of packets per second), go to step 15 (503). If not, then S has two options. (An available AC is "qualified" based upon other requirements that may be placed upon communication such as QoS metrics, security restrictions, cost to use ($), etc.)

a. Use the number of ACs under degraded communications conditions (515)

b. Try again later and go to Step 7 (513).

These two options do not have to be carried out in any particular order. The systems designer may decide the order of carrying these out.

12. If one of the above two options is successful (509), the process continues with Step 13. If not (511), then go to Step 7 or send an error message (517) to S's controller (system choice).

a. If S's controller receives this error message, the controller decides whether to try again later or take other action. The other action may simply be selecting another route discovery method.

13. The selected N1 s are now designated by S as elected MARS members (503).

14. Having identified its MARS members, S then broadcasts its user and systems traffic with the next-hop destinations being the MARS members (505). Non-MARS members of S will not forward any traffic even though they may receive it from its neighbors.

15. All of these steps are repeated at either regular or irregular intervals while the network is functioning.

16. Set S=S0+ij where ij is the jth member of the set of ith neighbors of S0 (507). Thus, after the first set of MARS members is elected, the next set of MARS members comes from using the N1 MARS members as the "S" members from which to begin the election process for the MARS members one-hop further out than the current set of MARS members.

17. If one of the N1 s of the current Sij=D (the destination of the communications), then STOP. If not, then repeat Steps 2-16 for each member of the current set of S A/Ns/nodes.

18. Repeat Step 17 for each current S A/N.

Notice that in the above MARS election process, if the entire network was frozen and a snapshot taken, the N1 and N2 sets would be seen as moving outward from the originating source. In other words, some A/Ns that are N2 s in relation to a given set of N1 s, would be the N1 s in relation to another set of N2 s further in hops from S0. At least one outward path will converge at the intended destination with the network minimizing the number of A/Ns with access to a maximum pool of ACs. The main pitfall in just looking at this analysis too simplistically is that the topology of the network is in general very dynamic. A/Ns that were once the N1 s in relation to a set of N2 s, might later in the evolution of the network switch roles where a given (N1 , N2 ) pair would look like (N2→N1 , N1→N2 ).

DNSRT may implement any tactic for obtaining useful AC lists. Examples of these are:

DNSRTs equipped with directional antennas,
Adaptive transmit power control,
Backoff and retry, and
Intentional A/N mobility control.

All other things being equal, choosing the largest set of available atomic channels in the band(s) that DNSRTs are operating in for every MARS A/N ensures the highest probability of traffic flow with the desired QoS from the source to the destination. DNSRT may buffer traffic up to the configuration limit of the particular DNSRT device until the qualified AC resources become available to release the buffered information to be passed further downstream.

Having fewer channels to transmit over enables the DNSRT to transmit further while keeping the total transmit power constant. Since transmitting further increases the probability of interfering with other RF communications, the DNSRT may perform an optimization process that either increases the number of channels to reduce its transmit power or dynamically reduces its total spectrum transmit power while still using fewer channels. The DNSRT performs the optimization balancing the link communication distance, bandwidth of communication and probability of interference using the number of fundamental channels, the total bandwidth transmit power and the type of traffic to be supported. Reducing the transmit power results in a multi-hopping requirement from source to destination and thus forces a MANET to form. The DNSRT of the present invention enables this forming of the MANET under those circumstances.

DNSRT Support for Network Services

A network of DNSRT nodes has unique, non-network services properties of the radio that although not part of a network service, off-loads some basic requirements of these services into the natural operational functionality of the DNSRT device. The DNSRT concept of a true multichannel CNR implements this off-loading of functionality. The umbrella term for all of the network services and associated functions of a network composed of at least a few multiple DNSRT radios is referred herein as "Dynamically Transformed Channel Set Networking" or just DTCSNet. Some DTCSNet services are discussed in other pending patent applications. This section briefly introduces DTCSNet services and mentions some of the specific mechanisms that provide service-supporting and off-loading functionality in the DNSRT. As is common to most modern day networking, each node (association) has a hardware/firmware component (radio, processor, etc) and a higher level firmware/software component. For example, routing appears in the more dynamic part (easily changed) of the node—software or firmware at Layer 3 and above. However, DNSRT services including routing use the DNSRT device-level MARS election process and the status of the routing operation to influence the knowledge-based decisions controlling the radio. But, while routing may have input to the MARS election process, it does not control the process nor is the election process part of routing. MARS election is part of the DNSRT device itself either as hardware (ASIC), firmware or some combination of the two.

Routing

MANET routing, including multicasting, is directly supported by the MARS election process. Much of the burden of route discovery is transferred from the routing service to (is subsumed by) the MARS election process, which is a natural part of the spectrum discovery and reuse functionality of the DNSRT of the present invention. Once a set of MARS A/Ns has been determined and provisioned for any given period of time, traffic can be routed on a hop-by-hop basis. The actual status of routes and the management of them is performed by MANET or mesh routing services and not by the DNSRT. But for optimal performance, a DNSRT device acts as the host of these networking services. DNSRT routing is referred herein to as "Dynamically Transformed Channel Set Routing" or DTCSR. The spectrum reuse aspect of the DNSRT removes much if not all of the next hop discovery overhead of routing.

Quality of Service

The overall QoS service, referred herein as "Dynamically Transformed Channel Set QoS" or just DTCSQ, encompasses multiple traditional network layers above the PHY (fully cross-layer) and may therefore be classified as a QoS framework. Besides the conventional mechanisms such as larger buffers used to support QoS, DNSRT is unique in that it can allocate more than one available channel at any given instant of time for QoS such that all channels involved in the QoS for the given traffic (e.g. a user application flow), are maintained in parallel. DNSRT can also choose the best channels out of the maximum possible to use for any given type of traffic. The DNSRT does not have to choose which channel(s) to use to send traffic over, as this function is associated with network services such as QoS or routing and the interactions of those services with the DTCSNet MACs. A DTCSNet MAC may be considered part of the physical "device". The interaction of the device and each network service is what provides many of the networking decisions.

A DNSRT device may automatically identify and prioritize the discovered set of channels according to basic PHY Layer QoS metrics dynamically or statically loaded into the device. The DNSRT does not have to handle the queuing of traffic, admission control, signaling and other QoS functions. Also, the DNSRT does not have to directly deal with the prioritization of specific types or classes of traffic, as these are all part of the QoS component itself. The DTCSQ MAC component utilizes the PHY Layer QoS information from DNSRT and then chooses from these available channels the number of channels to be sized for the QoS needed for communications among adjacent A/Ns. Channel sizing in this sense means combing multiple or partial ACs into one or more logical channels called Dynamically Transformed Channel Sets. DTCSQ is fully described in U.S. Provisional Patent Application No. 61/083,420, the disclosure of which is incorporated herein by reference.

Network Management

The DNSRT has the kernel-level hooks to support the dynamic, multi-spectral collection of status, reporting of faults, generation of usage statistics, configuration of network resources and provisioning of network resources to account for battery power usage, types of traffic, billing and other requirements. The DNSRT network management is referred herein as "Dynamically Transformed Channel Set Network Management" or DTCSNM.

Security

Security is of critical concern to any network. DNSRT may support any type of encryption or other forms of information assurance needed across its communications links and A/Ns. Its ability to dynamically choose which channels are used to transport traffic at any given time can be driven by security policies or concerns such as types of traffic, which users are communicating, the location of nodes and so on. This aspect is referred herein as "Dynamically Transformed Channel Set Security" or DTCSS.

Mobility Management

DNSRT includes the kernel-level hooks required to support mobility management for the nodes/associations in a DNSRT network. DNSRT mobility management may be referred to as "Dynamically Transformed Channel Set Mobility Management" or DTCSMM.

User Experience

DNSRT includes kernel-level hooks to support the dynamic, multi-spectral collection of status, reporting of faults, generation of usage statistics, configuration of network resources and provisioning of network resources to account for battery power usage, types of traffic, billing and other requirements. DNSRT User Experience may be referred to as "Dynamically Transformed Channel Set User Experience" or DTCSX.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for optimization of routing in a wireless network comprising:
    (a) identifying a communication for transmission from a source node (S) to a destination node (D);
    (b) discovering a first set of common available atomic channels between said S node and one or more nodes (N1) situated one hop from said S node;
    (c) using said first set of common available atomic channels, broadcasting to said N1 nodes a request to discover sets of common available atomic channels between each of said N1 nodes and one or more nodes (N2) situated one hop from each of said N1 nodes and two hops from said S node;
    (d) in parallel, each of said N1 nodes discovering available atomic channels between each of said N1 nodes and each of their said one hop N2 nodes;
    (e) each of said N1 nodes performing an AND operation on the set of available atomic channels between itself and its said one hop N2 nodes to obtain a common set of available atomic channels for each of said N1 nodes;
    (f) redesignating each of said N1 nodes as an S node and each N2 node as an N1 node and repeating steps (b) through (e) until said D node is one hop from an N1 node;
    (g) routing the communication to the (D) node through said set of common available atomic channels.

* * * * *